US006796202B2

(12) United States Patent
Takai et al.

(10) Patent No.: US 6,796,202 B2
(45) Date of Patent: Sep. 28, 2004

(54) SWITCH OPERATING MECHANISM

(75) Inventors: Toshihito Takai, Aichi-ken (JP); Shinji Watanabe, Aichi-ken (JP); Mamoru Miyako, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 174 days.

(21) Appl. No.: 10/261,770

(22) Filed: Oct. 2, 2002

(65) Prior Publication Data

US 2003/0061896 A1 Apr. 3, 2003

(30) Foreign Application Priority Data

Oct. 3, 2001 (JP) ....................................... 2001-307466

(51) Int. Cl.[7] ................................................ B60K 17/04

(52) U.S. Cl. ................. 74/473.12; 74/473.3; 200/61.54

(58) Field of Search ........................... 74/473.12, 473.3, 74/519, 523; 200/61.54, 61.55, 61.56, 329, 330, 332, 341

(56) References Cited

U.S. PATENT DOCUMENTS 2,939,447 A * 6/1960 Lucas et al. .................. 477/99
3,665,130 A * 5/1972 Suzuki .................... 200/61.27
3,683,144 A * 8/1972 Bowen et al. .............. 200/246
4,230,919 A * 10/1980 Schantz et al. ............. 200/462
4,877,925 A * 10/1989 Kobayashi .................. 200/5 A
5,219,070 A * 6/1993 Grunert et al. ............. 200/330
6,153,842 A * 11/2000 Sato ........................... 200/335

* cited by examiner

*Primary Examiner*—David A. Bucci
*Assistant Examiner*—Julie K. Smith
(74) *Attorney, Agent, or Firm*—Nixon Peabody, LLP

(57) ABSTRACT

In a switch operating mechanism, a switch of a circuit board is disposed between a first pressing arm and a second pressing arm of a pusher having a substantial U-shape when seen in side view, and the first pressing arm is positioned directly above the switch. A front end of an operating knob is disposed between the circuit board and the second pressing arm. When the operator moves the operating knob upward, the front end of the operating knob moves the second pressing arm of the pusher downward. Thus the pusher moves straight along the direction perpendicular to the plane of the circuit board, and the first pressing arm of the pusher presses and activates the switch.

15 Claims, 5 Drawing Sheets

SWITCH OPERATING MECHANISM

BACKGROUND OF THE INVENTION

1. Field of the Invention

The present invention relates to a switch operating mechanism in which an operator turns a switch on and/or off by pressing the switch provided at a circuit board.

2. Description of the Related Art

Some automobile steering wheels are equipped with, for example, a switch for shifting gears. Among such switch operating mechanisms, there is a type which is arranged to activate the switch by moving the operating knob upward so that the switch can be operated while an operator is holding the steering wheel.

A switch operating mechanism 50 of this type includes a circuit board 12 with a switch 14 (a contact member held by rubber) and an operating knob 54 that is supported by a spindle 52 so as to rotate about the spindle 52, which is provided at a lower position than the switch 14 as schematically illustrated in FIG. 4B. When the operator moves the operating knob 54 upward, the operating knob 54 rotates about the spindle 52, and a front end 54A of the operating knob 54 presses a pusher 56 downward, thereby turning the switch 14 on and/or off (i.e., a hinge-type operating knob).

However, the conventional switch operating mechanism 50 has some drawbacks. The operating knob 54 is cranked to operate the switch 14. Further, since the switch operating mechanism 50 is supported by a spindle provided at a lower position than the switch 14, the front end 54A of the operating knob 54 (the portion of the operating knob that presses the pusher 56) moves along an arcuate path around the spindle 52. Components of the pressing force act not only in an axial direction of the pusher 56 but also in a direction perpendicular thereto, and the relationship between a force F pressing the switch 14 and an operation stroke S deteriorates. As a result, operational feeling of the operating knob 54 is impaired. Moreover, there is a demand for using the space above the circuit board 12 effectively. However, a guide mechanism for guiding the pusher 56 occupies the space above the circuit board 12, making it impossible to use the space for other purposes in other ways.

SUMMARY OF THE INVENTION

In view of the aforementioned facts, an object of the present invention is to provide a switch operating mechanism, which has an operating knob that gives the operator an improved operational feeling and, at the same time, meets the demand for effective use of the space above the circuit board.

A first aspect of the present invention is a switch operating mechanism for turning a switch on and/or off by pressing the switch, which is provided at a circuit board, the mechanism comprising: an operating knob, which has a front end and a back end and is rotatably supported by a spindle that is provided at a lower position than the switch; and a pusher having a base, a first pressing arm, and a second pressing arm, the first pressing arm and the second pressing arm extending parallel to each other from both ends of the base in a direction perpendicular to an axial direction of the base such that the pusher has a substantial U-shape when seen in side view, wherein the switch of the circuit board is disposed between the first and the second pressing arms of the pusher, the first pressing arm being positioned directly above the switch and able to press the same; the operating knob is disposed such that the front end thereof is disposed between the circuit board and the second pressing arm so that the front end is able to press the second pressing arm; and when the back end of the operating knob is moved upward, the front end thereof moves the second pressing arm of the pusher downward, whereby the pusher moves linearly along a direction perpendicular to the plane of the circuit board, and the first pressing arm of the pusher presses the switch to turn the switch on and/or off.

In the switch operating mechanism of the first aspect of the present invention, when the operator moves the operating knob upward, the operating knob rotates and the front end thereof moves the second pressing arm of the pusher downward. Thus, the pusher moves linearly along the direction perpendicular to the plane of the circuit board, and the first pressing arm of the pusher presses the switch to turn the switch on and/or off.

In the switch operating mechanism, the operating knob is supported by the spindle, which is disposed at a lower position than the switch, and the pusher is formed in a substantial U-shape when seen in side view. Accordingly, even if the front end of the operating knob (the portion of the operating knob that presses the second pressing arm of the pusher) moves along an arcuate path around the spindle, the linear movement of the pusher presses and activates the switch. Thus, operational feeling of the operating knob, i.e., a relationship between a force pressing the switch and an operation stroke can be much closer to an ideal relationship. Further, in the switch operating mechanism, the switch of the circuit board is disposed between the first and the second pressing arms of the pusher. Accordingly, a guide mechanism for guiding the pusher may be provided along the base of the pusher (at the base side of the pusher). In other words, it is not necessary to provide the guide mechanism above the circuit board, whereby the space above the circuit board can be used effectively.

A second aspect of the present invention is a switch operating mechanism provided in a vehicle, for turning a switch on and/or off by pressing the switch provided at a circuit board, the mechanism comprising: an operating knob, which has a front end and a back end and is rotatably supported by a spindle that is provided at a lower position than the switch; and a pusher having a base, a first pressing arm, and a second pressing arm, the first pressing arm and the second pressing arm extending parallel to each other from both ends of the base in a direction perpendicular to an axial direction of the base such that the pusher has a substantial U-shape when seen in side view, wherein the switch of the circuit board is disposed between the first and the second pressing arms of the pusher, the first pressing arm being positioned directly above the switch and able to press the same; the operating knob is disposed such that the front end thereof is disposed between the circuit board and the second pressing arm so that the front end is able to press the second pressing arm; and when the back end of the operating knob is moved upward, the front end thereof moves the second pressing arm of the pusher downward, whereby the pusher moves linearly along a direction perpendicular to the plane of the circuit board, and the first pressing arm of the pusher presses the switch to turn the switch on and/or off.

A third aspect of the present invention is a method of manufacturing a switch operating mechanism for turning a switch on and/or off by pressing the switch, the method comprising the steps of: a. manufacturing a operating knob having a front end and a back end; b. manufacturing a pusher having a base, a first pressing arm, and a second pressing arm, the first pressing arm and the second pressing arm extending parallel to each other from both ends of the base in a direction perpendicular to an axial direction of the base such that the pusher has a substantial U-shape when seen in side view; c. mounting the operating knob to a spindle provided at a lower position than the switch so as to rotate about the spindle; and d. disposing the switch and the front end of the operating knob between the first pressing arm and the second pressing arm.

DESCRIPTION OF THE PREFERRED EMBODIMENT

Figure 3:
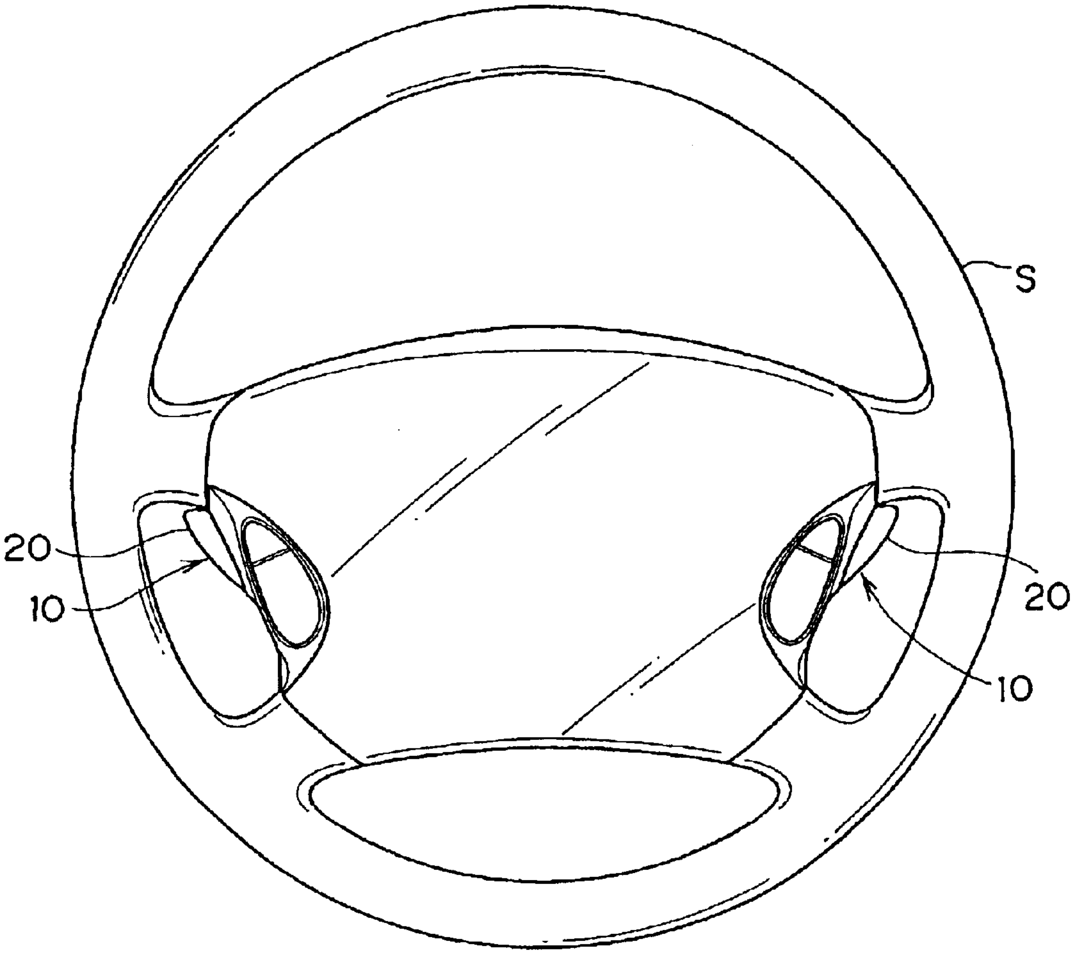
FIG. 3 is a front view of a steering wheel equipped with the switch operating mechanism of the embodiment of the present invention.

A switch operating mechanism 10 relating to an embodiment of the present invention is provided at, for example, a steering wheel in an automobile as shown in FIG. 3. The switch operating mechanism 10 is used as an operating mechanism for shifting gears.

Figure 1:
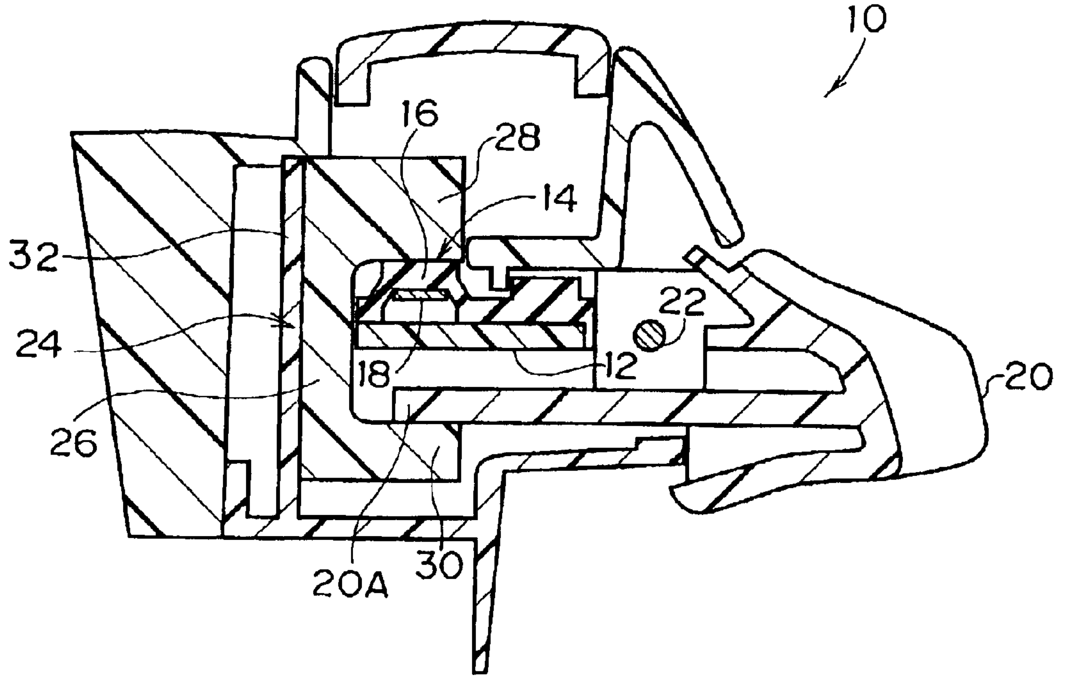
FIG. 1 is a sectional view showing a structure of a switch operating mechanism of an embodiment of the present invention.
Figure 2:
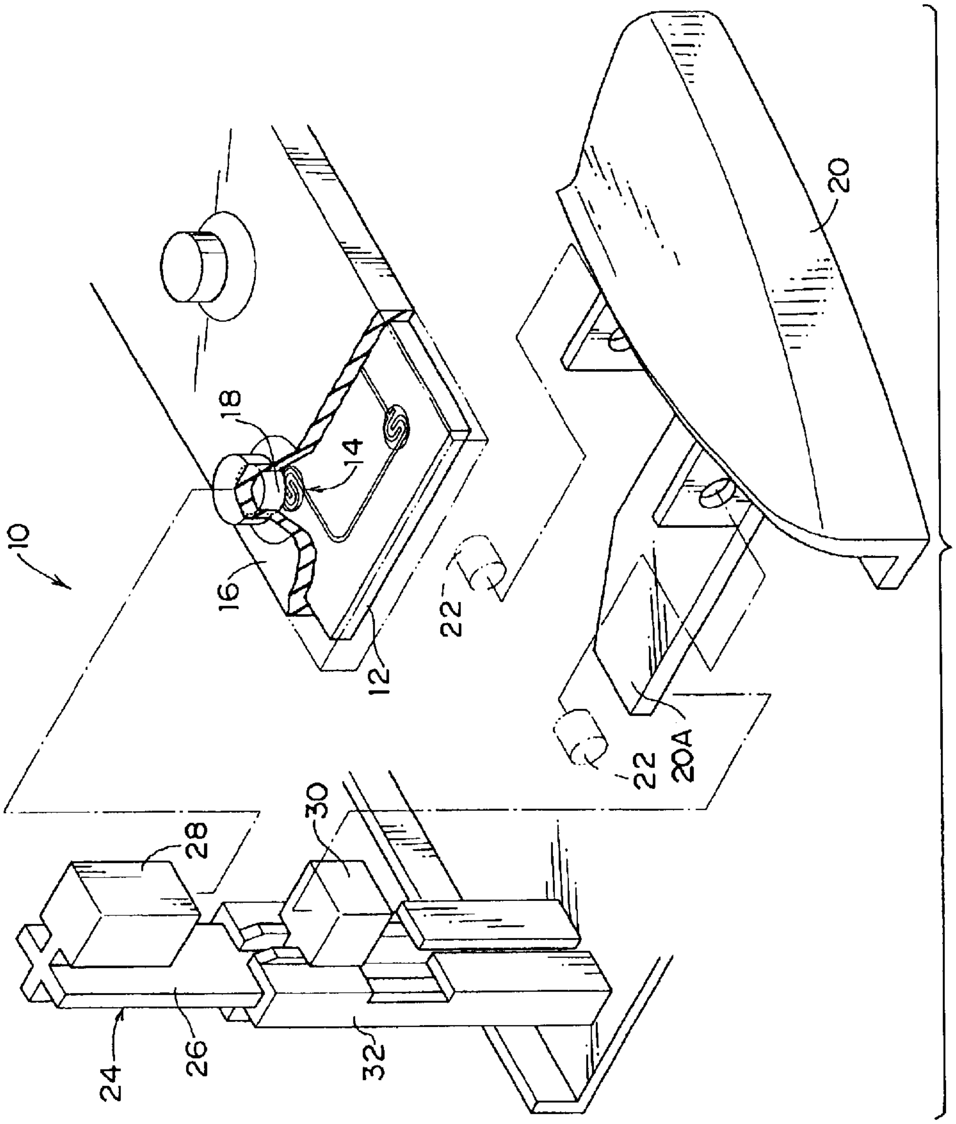
FIG. 2 is a schematic perspective view showing the structure of the switch operating mechanism of the embodiment of the present invention.

FIG. 1 is a sectional view, and FIG. 2 is a schematic perspective view, of the structure of the switch operating mechanism 10.

The switch operating mechanism 10 includes a circuit board (i.e., a PC board) 12. The circuit board 12 has a predetermined switch circuit formed thereon, and is provided with a switch 14. A contact member 18 of the switch 14 is held by a rubber holding sheet 16 which has a predetermined elasticity. When the contact member 18 is pressed on the circuit board 12 against the elastic force of the rubber holding sheet 16, the electric circuit is closed and/or opened (i.e., turned on and/or off).

An operating knob 20 is provided at a lateral side of the circuit board 12. The operating knob 20 is supported by a spindle 22, which is provided at a lower position than the switch 14 of the circuit board 12 so that the operating knob 20 can rotate about the spindle 22.

The switch operating mechanism 10 further includes a pusher 24. The pusher 24 has a base 26, a first pressing arm 28, and a second pressing arm 30. The first pressing arm 28 and the second pressing arm 30 extend parallel to each other from both ends of the base 26 in the direction perpendicular to the axial direction of the base 26. Namely, the pusher 24 has a substantial U-shape when seen in side view. The pusher 24 is supported by a guide 32, which is provided to stand vertically, so as to slide in the axial direction of the base 26.

The switch 14 of the circuit board 12 is disposed between the first and the second pressing arms 28 and 30 of the pusher 24. The first pressing arm 28 is positioned directly above the switch 14 and is able to press the same. The front end 20A of the operating knob 20 is disposed between the circuit board 12 and the second pressing arm 30 so that the front end 20A is able to press the second pressing arm 30. Therefore, when the operating knob 20 is moved upward, the front end 20A moves the second pressing arm 30 downward. The pusher 24 is moved linearly along the direction perpendicular to the plane of the circuit board 12, and the switch 14 is turned on and/or off by the first pressing arm 28.

Since the operating knob 20 is supported by the spindle 22, which is disposed at a lower position than the switch 14, the switch 14 can be pressed and activated by the linear movement of the pusher 24, which is formed in a substantial U-shape when seen in side view, even if the front end 20A (the portion of the operating knob that presses the second pressing arm 30) moves around the spindle 22 along an arcuate path. Thus, the operational feeling of the operating knob 20, i.e., a relationship between a force pressing the switch 14 and an operation stroke can be much closer to an ideal relationship.

Figure 4A:
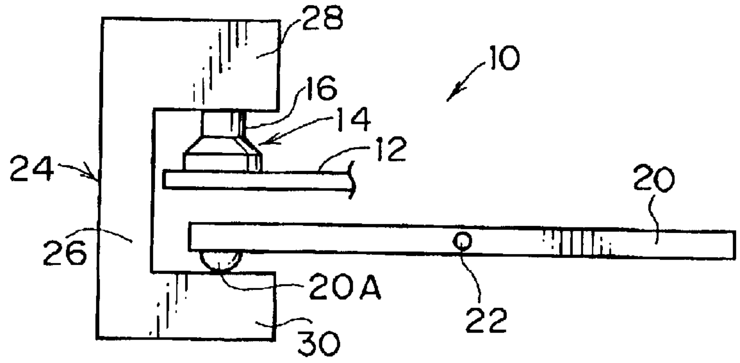
FIG. 4A is a diagram schematically showing the switch operating mechanism of the embodiment of the present invention.
Figure 4B:
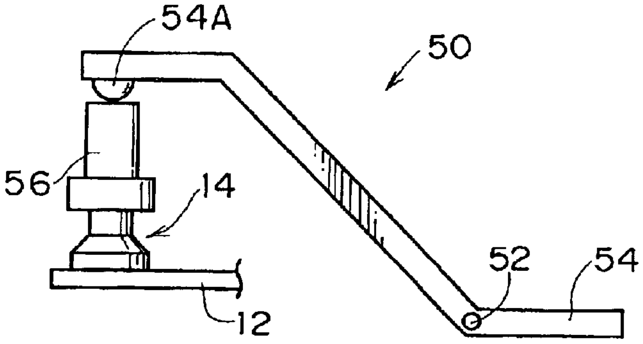
FIG.4B PRIOR ART
FIG. 4B is a diagram schematically showing a conventional switch operating mechanism with a hinge-type operating knob.
Figure 4C:
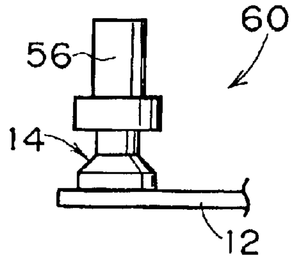
FIG. 4C is a diagram schematically showing a switch operating mechanism, which only uses a pusher to press a switch instead of using an operating knob.

The switch operating mechanism 10 of the present embodiment and conventional mechanisms to be compared therewith are illustrated in FIGS. 4A through 4C. FIG. 4A shows the switch operating mechanism 10 of the present embodiment. FIG. 4B shows a conventional switch operating mechanism 50 with a hinge-type operating knob 54. FIG. 4C shows a switch operating mechanism 60, which only uses pusher 56 to press a switch instead of using an operating knob.

Figure 5:
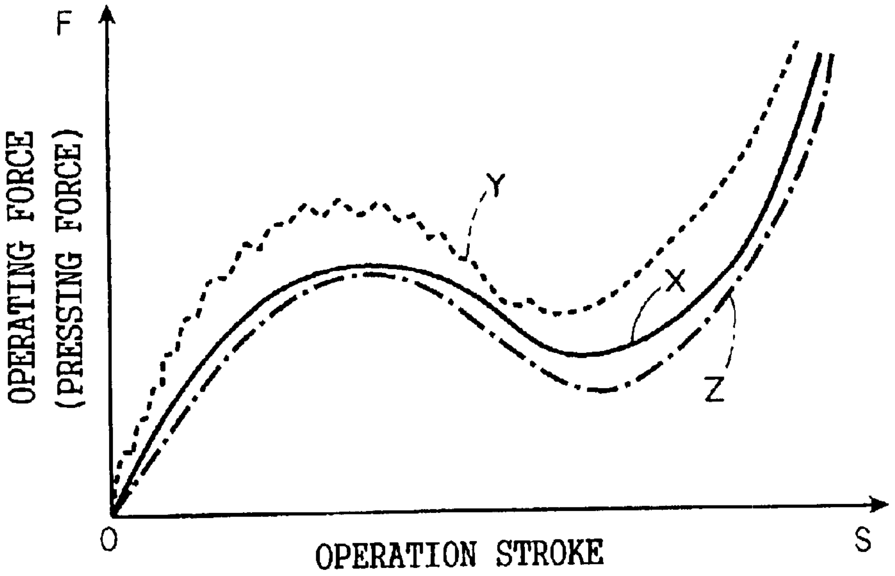
FIG. 5 is a graph showing a relationship between a pressing force and an operation stroke, used for comparing an operational feeling of an operating knob of the switch operating mechanism of the present invention with those of conventional mechanisms.

FIG. 5 is a graph comparing the operational feeling (i.e., the relationship between the force F pressing the switch 14 and the operation stroke S) of the switch operating mechanism 10 of the present embodiment with those of the conventional mechanisms. A line X relates to the switch operating mechanism 10 of the present embodiment and a line Y relates to the conventional switch mechanism 50 with a hinge-type operating knob 54. a line Z relates to the switch operating mechanism 60, which only uses pusher 56 to press a switch instead of using an operating knob.

As the line Z shows, the switch operating mechanism 60, which is constructed to press by only using the pusher 56 without the usage of an operating knob, provides the ideal characteristic of the operational feeling (i.e., the relationship between the force F pressing the switch 14 and the operation stroke S).

In the conventional switch operating mechanism 50 with a hinge-type operating knob 54, the operating knob 54 is cranked to operate the switch 14 and is supported by a spindle 52 provided at a lower position than the switch 14. Since the front end 54A of the operating knob 54 (the portion at which the operating knob 54 presses the pusher 56) moves along an arcuate path around the spindle 52, noises occur in the pressing force F (i.e., components of the pressing force act not only in the axial direction of the pusher 56 but also in the direction perpendicular thereto), and the operational feeling of the operating knob 54 is impaired as shown by the line Y (i.e., the characteristic shown by the line Y differs significantly from that shown by the line Z).

In the switch operating mechanism 10 of the present embodiment, the linear movement of the pusher 24, which is formed in a substantial U-shape when seen in side view, presses and activates the switch 14. Thus, as the line X shows, the operational feeling of the operating knob 20 can be much closer to the ideal characteristic (i.e., the characteristic shown by the line Z).

Further, in the switch operating mechanism 10, the switch 14 of the circuit board 12 is disposed between the first and the second pressing arms 28 and 30 of the pusher 24. Accordingly, a guide mechanism for guiding the pusher 24 may be provided along the base 26 of the pusher 24 (on the base 26 side of the pusher). That is, it is not necessary to provide the guide mechanism above the circuit board 12, whereby the space above the circuit board 12 can be used effectively.

As described above, the switch operating mechanism of the present invention has excellent effects such as providing an operating knob that has an improved operational feeling, and at the same time, meets the demand for effective use of the space above the circuit board.

What is claimed is:

1. A switch operating mechanism for turning a switch on and/or off by pressing the switch, which is provided at a circuit board, the mechanism comprising:

an operating knob, which has a front end and a back end and is rotatably supported by a spindle that is provided at a lower position than the switch; and a pusher having a base, a first pressing arm, and a second pressing arm, the first pressing arm and the second pressing arm extending parallel to each other from both ends of the base in a direction perpendicular to an axial direction of the base such that the pusher has a substantial U-shape when seen in side view, wherein the switch of the circuit board is disposed between the first and the second pressing arms of the pusher, the first pressing arm being positioned directly above the switch and able to press the same;

the operating knob is disposed such that the front end thereof is disposed between the circuit board and the second pressing arm so that the front end is able to press the second pressing arm; and when the back end of the operating knob is moved upward, the front end thereof moves the second pressing arm of the pusher downward, whereby the pusher moves linearly along a direction perpendicular to the plane of the circuit board, and the first pressing arm of the pusher presses the switch to turn the switch on and/or off.

2. The mechanism according to claim 1, wherein the spindle is disposed at a higher position than the front end of the operating knob.

3. The mechanism according to claim 1, further comprising a guide mechanism provided parallel to the pusher in an axial direction thereof, wherein the pusher is slidably supported by the guide mechanism so as to move linearly along the direction perpendicular to the plane of the circuit board.

4. The mechanism according to claim 3, which is provided in a vehicle.

5. The mechanism according to claim 3, which is provided at a steering wheel in a vehicle.

6. The mechanism according to claim 5, which is used for shifting gears while the vehicle is driven.

7. A switch operating mechanism provided in a vehicle, for turning a switch on and/or off by pressing the switch provided at a circuit board, the mechanism comprising:

an operating knob, which has a front end and a back end and is rotatably supported by a spindle that is provided at a lower position than the switch; and a pusher having a base, a first pressing arm, and a second pressing arm, the first pressing arm and the second pressing arm extending parallel to each other from both ends of the base in a direction perpendicular to an axial direction of the base such that the pusher has a substantial U-shape when seen in side view, wherein the switch of the circuit board is disposed between the first and the second pressing arms of the pusher, the first pressing arm being positioned directly above the switch and able to press the same;

the operating knob is disposed such that the front end thereof is disposed between the circuit board and the second pressing arm so that the front end is able to press the second pressing arm; and when the back end of the operating knob is moved upward, the front end thereof moves the second pressing arm of the pusher downward, whereby the pusher moves linearly along a direction perpendicular to the plane of the circuit board, and the first pressing arm of the pusher presses the switch to turn the switch on and/or off.

8. The mechanism according to claim 7, wherein the spindle is disposed at a higher position than the front end of the operating knob.

9. The mechanism according to claim 7, further comprising a guide mechanism provided parallel to the pusher in an axial direction thereof, wherein the pusher is slidably supported by the guide mechanism so as to move linearly along the direction perpendicular to the plane of the circuit board.

10. The mechanism according to claim 9, which is provided at a steering wheel in a vehicle.

11. The mechanism according to claim 10, which is used for shifting gears while the vehicle is driven.

12. A method of manufacturing a switch operating mechanism for turning a switch on and/or off by pressing the switch, the method comprising the steps of:

a. manufacturing a operating knob having a front end and a back end;

b. manufacturing a pusher having a base, a first pressing arm, and a second pressing arm, the first pressing arm and the second pressing arm extending parallel to each other from both ends of the base in a direction perpendicular to an axial direction of the base such that the pusher has a substantial U-shape when seen in side view;

c. mounting the operating knob to a spindle provided at a lower position than the switch so as to rotate about the spindle; and d. disposing the switch and the front end of the operating knob between the first pressing arm and the second pressing arm.

13. The method according to claim 12, wherein the spindle is disposed at a higher position than the front end of the operating knob.

14. The method according to claim 13, wherein the switch is disposed directly below the first pressing arm.

15. The method according to claim 14, further comprising the step for manufacturing a guide mechanism which slidably supports the pusher in an axial direction of the pusher.

* * * * *